US009313689B2

United States Patent
Yui et al.

(10) Patent No.: US 9,313,689 B2
(45) Date of Patent: Apr. 12, 2016

(54) WIRELESS COMMUNICATION APPARATUS AND TRANSMISSION FRAME CONTROL METHOD

(71) Applicant: Panasonic Corporation, Osaka (JP)

(72) Inventors: Tomohiro Yui, Kanagawa (JP); Yuji Kuwahara, Kanagawa (JP); Yoshinao Kawai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 15 days.

(21) Appl. No.: 14/400,319

(22) PCT Filed: Mar. 5, 2014

(86) PCT No.: PCT/JP2014/001222
§ 371 (c)(1),
(2) Date: Nov. 10, 2014

(87) PCT Pub. No.: WO2014/141635
PCT Pub. Date: Sep. 18, 2014

(65) Prior Publication Data
US 2015/0124599 A1    May 7, 2015

(30) Foreign Application Priority Data

Mar. 12, 2013   (JP) .................................. 2013-049366

(51) Int. Cl.
*H04L 1/00* (2006.01)
*H04W 28/06* (2009.01)

(52) U.S. Cl.
CPC ............ *H04W 28/06* (2013.01); *H04W 28/065* (2013.01)

(58) Field of Classification Search
CPC ......... H04L 47/10; H04L 47/11; H04L 47/12; H04L 47/13; H04L 2012/5631; H04L 2012/5632; H04L 2012/5633; H04L 2012/5634; H04L 12/5602; H04L 12/5603; H04L 12/5604; H04L 47/22; H04L 47/23; H04L 47/24; H04L 47/25; H04L 47/02
USPC .......................................... 370/229–235, 328
See application file for complete search history.

(56) References Cited

U.S. PATENT DOCUMENTS

| 5,452,009 | A | * | 9/1995 | Citta | ................. | H03M 13/2732 348/466 |
| 6,301,479 | B1 | | 10/2001 | Roobol et al. | | |
| 6,779,125 | B1 | * | 8/2004 | Haban | .............. | H03K 3/356113 327/157 |

(Continued)

FOREIGN PATENT DOCUMENTS

| JP | 2003-504968 A | 2/2003 |
| JP | 2005-223425 A | 8/2005 |

(Continued)

OTHER PUBLICATIONS

International Search Report, mailed Apr. 8, 2014, for International Application No. PCT/JP2014/001222, 4 pages.

(Continued)

*Primary Examiner* — Dady Chery
(74) *Attorney, Agent, or Firm* — Seed IP Law Group PLLC

(57) ABSTRACT

A wireless communication apparatus which switches between plural wireless communication schemes that are different from each other in maximum transmission frame size includes a means for selecting one of the plural wireless communication schemes, a means for generating a transmission frame, a means for dividing the generated transmission frame if the size of the transmission frame is larger than a maximum transmission frame size of the selected wireless communication scheme, and a means for transmitting the transmission frame or divided transmission frames according to the selected wireless communication scheme.

6 Claims, 9 Drawing Sheets

(56) References Cited

U.S. PATENT DOCUMENTS 6,882,634 B2 * 4/2005 Bagchi .................. H04L 1/0003
370/338
2010/0278062 A1 11/2010 Abraham et al.
2012/0236821 A1 9/2012 Yamada et al.

FOREIGN PATENT DOCUMENTS

| | | |
|---|---|---|
| JP | 2010-263576 A | 11/2010 |
| JP | 2012-209925 A | 10/2012 |
| JP | 2012-523770 A | 10/2012 |

OTHER PUBLICATIONS

IEEE Standard for Local and metropolitan area networks-, "Part 21: Media Independent Handover Services," Sponsor LAN/MAN Standards Commitee of the IEEE Computer Society, IEEE-SA Standards Board, Nov. 11, 2008, 323 pages.

* cited by examiner

WIRELESS COMMUNICATION APPARATUS AND TRANSMISSION FRAME CONTROL METHOD

TECHNICAL FIELD

The present disclosure relates to a wireless communication apparatus and a transmission frame control method in which data transmission and reception are performed in such a manner that the wireless communication scheme is switched adaptively.

BACKGROUND ART

In recent years, wireless communication apparatus which are compatible with plural wireless communication schemes have come to be used widely. For example, many kinds of smartphones are compatible with the WLAN scheme which is defined by the IEEE 802.11 standard in addition to the wireless communication scheme called LTE (Long Term Evolution) which is defined by the standards organization 3GPP (The 3rd Generation Partnership Project). The WLAN scheme includes a wireless communication scheme that enables operation in plural frequency bands such as a 2.4 GHz frequency band, a 5 GHz frequency band, a 60 GHz frequency band, and a frequency band that is lower than 1 GHz.

Being compatible with plural wireless communication schemes as described above allows a wireless communication apparatus to select an optimum wireless communication scheme and radio frequency band adaptively and to utilize a stable communication environment. However, a data loss occurs if a wireless communication apparatus switches the wireless communication scheme and the radio frequency band during a communication.

PRIOR ART DOCUMENTS

Patent Documents

Patent document 1: JP-A-2012-209925

SUMMARY OF THE INVENTION

Problems to be Solved by the Invention

In the configuration of Patent document 1, the communication throughput may lower though when the communication scheme is switched.

An object of the present disclosure is to provide a wireless communication apparatus and a transmission frame control method which can realize a high-quality communication by suppressing data loss even at the time of switching between wireless communication schemes that are different from each other in maximum transmission frame size.

Means for Solving the Problems

A wireless communication apparatus according to the disclosure is a wireless communication apparatus which performs a data transmission and reception while switching between plural wireless communication schemes that are different from each other in maximum transmission frame size, including a scheme selector that selects one of the plural wireless communication schemes; a transmission frame generator that generates a transmission frame; a transmission frame divider that divides the transmission frame generated by the transmission frame generator if a size of the transmission frame is larger than a maximum transmission frame size of the wireless communication scheme selected by the scheme selector and a wireless transmitter that transmits, according to the wireless communication scheme selected by the scheme selector, the transmission frame generated by the transmission frame generator or divided transmission frames generated by the transmission frame divider by dividing the transmission frame, wherein the transmission frame divider divides the transmission frame into the divided transmission frames each having a size that is smaller than or equal to the maximum transmission frame size of the wireless communication scheme selected by the scheme selector.

A transmission frame control method according to the disclosure is a transmission frame control method of a wireless communication apparatus which performs a data transmission and reception while switching between plural wireless communication schemes that are different from each other in maximum transmission frame size, comprising a scheme selection step of selecting one of the plural wireless communication schemes; a transmission frame generating step of generating a transmission frame; a transmission frame dividing step of dividing the transmission frame generated by the transmission frame generating step if a size of the transmission frame is larger than a maximum transmission frame size of the wireless communication scheme selected by the scheme selection step; and a wireless transmission step of transmitting, according to the wireless communication scheme selected by the scheme selection step, the transmission frame generated by the transmission frame generating step or divided transmission frames generated by the transmission frame dividing step by dividing the transmission frame, wherein in the transmission frame dividing step, the transmission frame is divided into the divided transmission frames each having a size that is smaller than or equal to the maximum transmission frame size of the wireless communication scheme selected by the scheme selection step.

Advantages of the Invention

The disclosure enables a high-quality communication by suppressing data loss even at the time of switching between wireless communication schemes that are different from each other in maximum transmission frame size.

MODES FOR CARRYING OUT THE INVENTION

Before the description of wireless communication apparatus and transmission frame control methods according to embodiments of the present disclosure, the background of the wireless communication apparatus and transmission frame control methods according to the disclosure will be described with reference to the drawings.

Figure 8:
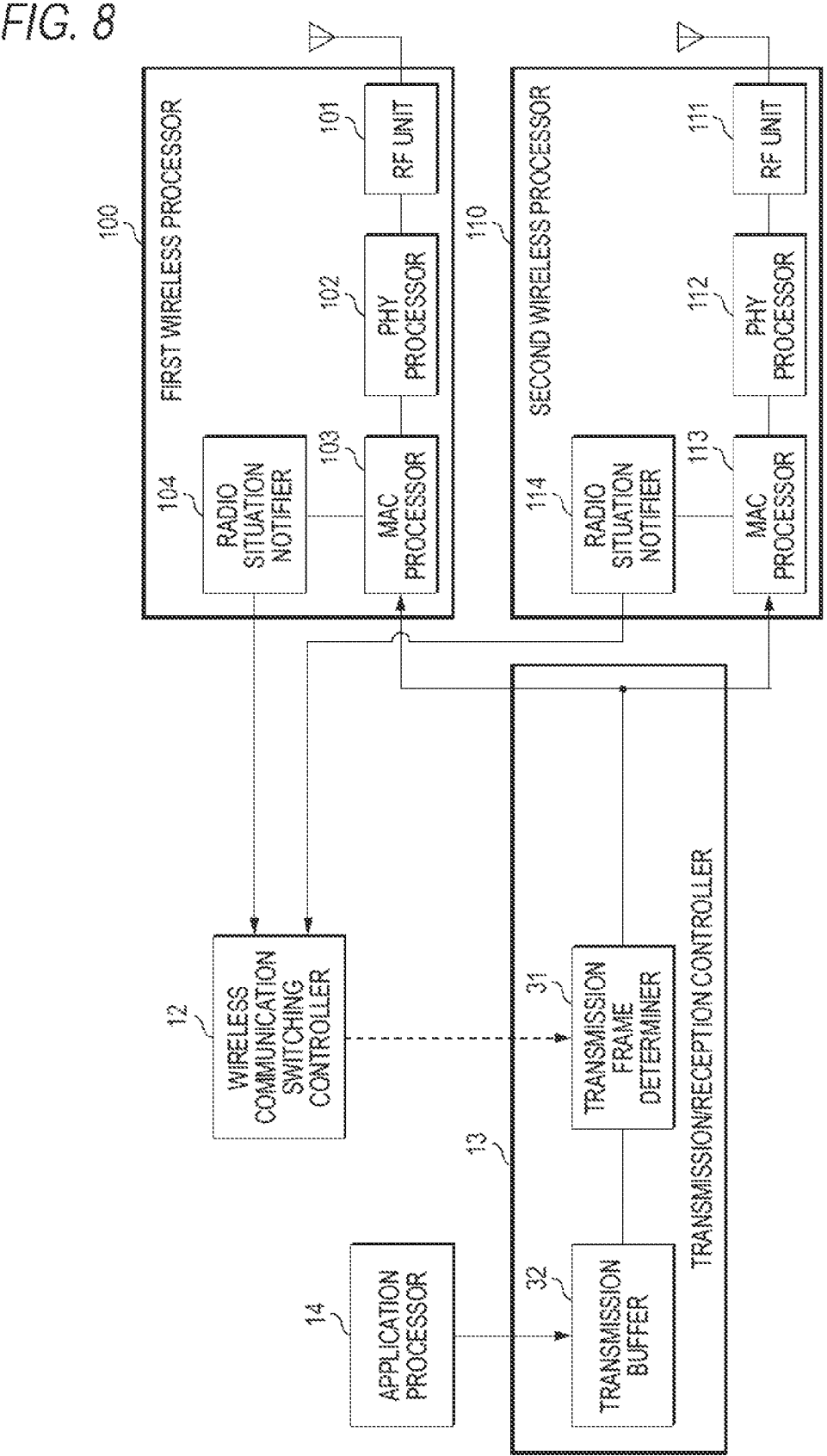
FIG. 8 is a block diagram showing the internal configuration of a conventional wireless communication apparatus.

Among conventional wireless communication apparatus are ones which suppress data loss by determining a switching destination transmission start packet on the basis of retransmission information at the time of wireless communication scheme switching (refer to Patent document 1, for example). FIG. 8 is a block diagram showing the internal configuration of a conventional wireless communication apparatus.

The wireless communication apparatus shown in FIG. 8 includes a first wireless processor 100, a second wireless processor 110, a wireless communication switching controller 12, a transmission/reception controller 13, and an application processor 14. The first wireless processor 100 has an RF (radio frequency) unit 101, a PHY (physical layer) processor 102, a MAC (media access control) processor 103, and a radio situation notifier 104. Likewise, the second wireless processor 110 has an RF unit 111, a PHY processor 112, a MAC processor 113, and a wireless communication situation notifier 114.

A description will be made below of a case that the wireless communication apparatus shown in FIG. 8 performs data transmission and reception using the first wireless processor 100. Transmission MSDUs (MAC service data units) that are output from the transmission/reception controller 13 are input to the MAC processor 103 of the first wireless processor 100. The MAC processor 103 performs MAC transmission processing (e.g., attachment of sequence numbers and encryption processing) that is prescribed by a first wireless communication scheme employed by the first wireless processor 100, and outputs transmission PSDUs (PHY service data units) to the PHY processor 102. The PHY processor 102 performs PHY transmission processing (e.g., coding processing and modulation processing) that is prescribed by the first wireless communication scheme, and outputs transmission frames to the RF unit 101. The RF unit 101 transmits the transmission frames in a prescribed radio frequency band.

Reception frames received by the RF unit 101 are input to the PHY processor 102. The PHY processor 102 performs PHY reception processing (e.g., demodulation processing and decoding processing) that is prescribed by the first wireless communication scheme, and outputs reception PSDUs to the MAC processor 103. The MAC processor 103 performs MAC reception processing (e.g., discard of duplicate sequence numbers and decryption processing) that is prescribed by the first wireless communication scheme employed by the first wireless processor 100, and outputs reception MSDUs to the transmission/reception controller 13. The radio situation notifier 104 measures a radio wave situation including a reception power value, and supplies a radio situation notification signal to the wireless communication switching controller 12. The second wireless processor 110 which performs processing according to a second wireless communication scheme operates in the same manner as the first wireless processor 100.

The wireless communication switching controller 12 determines whether the wireless communication apparatus should perform a communication according to the first wireless communication scheme or the second wireless communication scheme on the basis of respective radio situation notification signals supplied from the first wireless processor 100 and the second wireless processor 110. The wireless communication switching controller 12 instructs the transmission/reception controller 13 to perform a communication according to the determined wireless communication scheme.

As shown in FIG. 8, the transmission/reception controller 13 has a transmission buffer 32 and a transmission frame determiner 31. In the transmission/reception controller 13, transmission frames that are input from the application processor 14 are stored in the transmission buffer 32 temporarily. The transmission frame determiner 31 determines which of the transmission frames stored in the transmission buffer 32 should be transmitted first on the basis of a retransmission state and information indicating a wireless communication scheme specified by the wireless communication switching controller 12, and outputs transmission frames that are read from the transmission buffer 32 to the wireless processor that employs the wireless communication scheme specified by the wireless communication switching controller 12.

Figure 9:
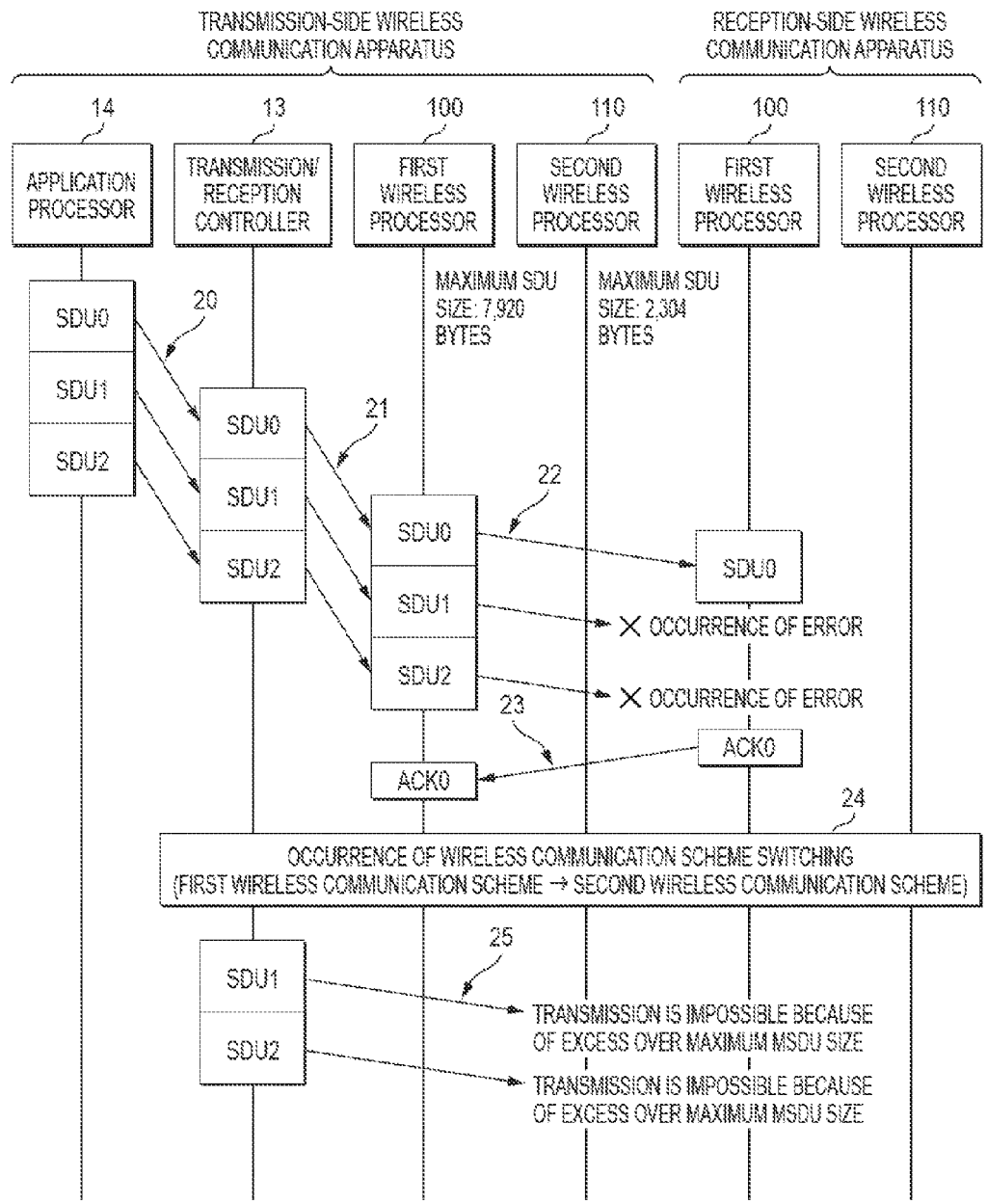
FIG. 9 is a timing chart showing how the wireless communication apparatus shown in FIG. 8 operates when the wireless communication scheme is switched.

FIG. 9 is a timing chart showing how the wireless communication apparatus shown in FIG. 8 operates when the wireless communication scheme is switched. FIG. 9 assumes that the maximum SDU sizes of the first wireless processor 100 and the second wireless processor 110 are 7,920 bytes and 2,304 bytes, respectively. In the example of FIG. 9, three transmission frames SDU0, SDU1, and SDU2 (generated in this order) of 7,920 bytes generated by the application processor 14 are transferred to the transmission/reception controller 13 from the application processor 14 by transmission frame transfers 20 and stored in the transmission buffer 32 of the transmission/reception controller 13. In transmission frame transfers 21 from the transmission/reception controller 13 to the first wireless processor 100, the transmission frames SDU0, SDU1, and SDU2 stored in the transmission buffer 32 are transferred in this order to the MAC processor 103 of the first wireless processor 100. Subsequently, data transmissions 22 are performed according to the first wireless communication scheme which is employed by the first wireless processor 100. In the data transmissions 22, the transmission frames SDU0, SDU1, and SDU2 which have been transferred to the MAC processor 103 by the transmission frame transfers 21 are sent out in this order from the first wireless processor 100 to a radio propagation path.

A transmission frame that has been sent out to the radio propagation path may not reach the reception-side wireless communication apparatus depending on the radio environment due to occurrence of an error on the radio propagation path. In the example of FIG. 9, the transmission frames SDU1 and SDU2 do not reach the reception-side wireless communication apparatus due to errors occurring on the radio propagation path. In this case, in an ACK data reception 23 of the wireless communication scheme employed by the first wireless processor 100, only a delivery acknowledgment frame ACK0 for the transmission frame SDU0 which has reached the reception-side wireless communication apparatus is received. The transmission frames SDU1 and SDU2 remain in the transmission buffer 32.

If wireless communication scheme switching 24 occurs in this state in the transmission-side wireless communication apparatus, switching is made from the first wireless communication scheme to the second wireless communication scheme. After the switching from the first wireless communication scheme to the second wireless communication scheme, transmission frame transfers 25 from the transmission/reception controller 13 to the second wireless processor 110 are performed to retransmit, according to the second wireless communication scheme, the transmission frames SDU1 and SDU2 for which no delivery acknowledgments have been received. However, since the sizes (7,920 bytes) of the transmission frames SDU1 and SDU2 are larger than the maximum SDU size (2,304 bytes) of the second wireless processor 110, the second wireless processor 110 cannot transmit the transmission frames SDU1 and SDU2.

To retransmit transmission frames when switching has been made between wireless communication schemes having different maximum SDU sizes (described above), it is necessary to generate transmission frames in such a manner that their maximum SDU sizes are fixed to the smallest value of the maximum SDU sizes of plural wireless communication schemes in advance. For example, the maximum SDU size of a WLAN scheme (e.g., Wi-Fi (registered trademark)) that uses a microwave band (e.g., 2.4 GHz frequency band) is 2,304 bytes and a WLAN scheme (WiGig (registered trademark)) that uses a millimeter wave band (e.g., 60 GHz frequency band) is 7,920 bytes. To allow a wireless communication apparatus to retransmit, according to Wi-Fi, transmission frames it transmitted according to WiGig, it is necessary to set its maximum SDU size to 2,304 bytes even at the time of transmission according to WiGig. However, since the original maximum SDU size of WiGig is 7,920 bytes, doing so results in a throughput reduction during a WiGig communication.

In view of the above, the following embodiments will be directed to wireless communication apparatus and transmission frame control methods which can realize a high-quality communication by suppressing data loss even at the time of switching between wireless communication schemes that are different from each other in maximum transmission frame size.

The embodiments of the disclosure will be hereinafter described with reference to the drawings.

Embodiment 1

Figure 1:
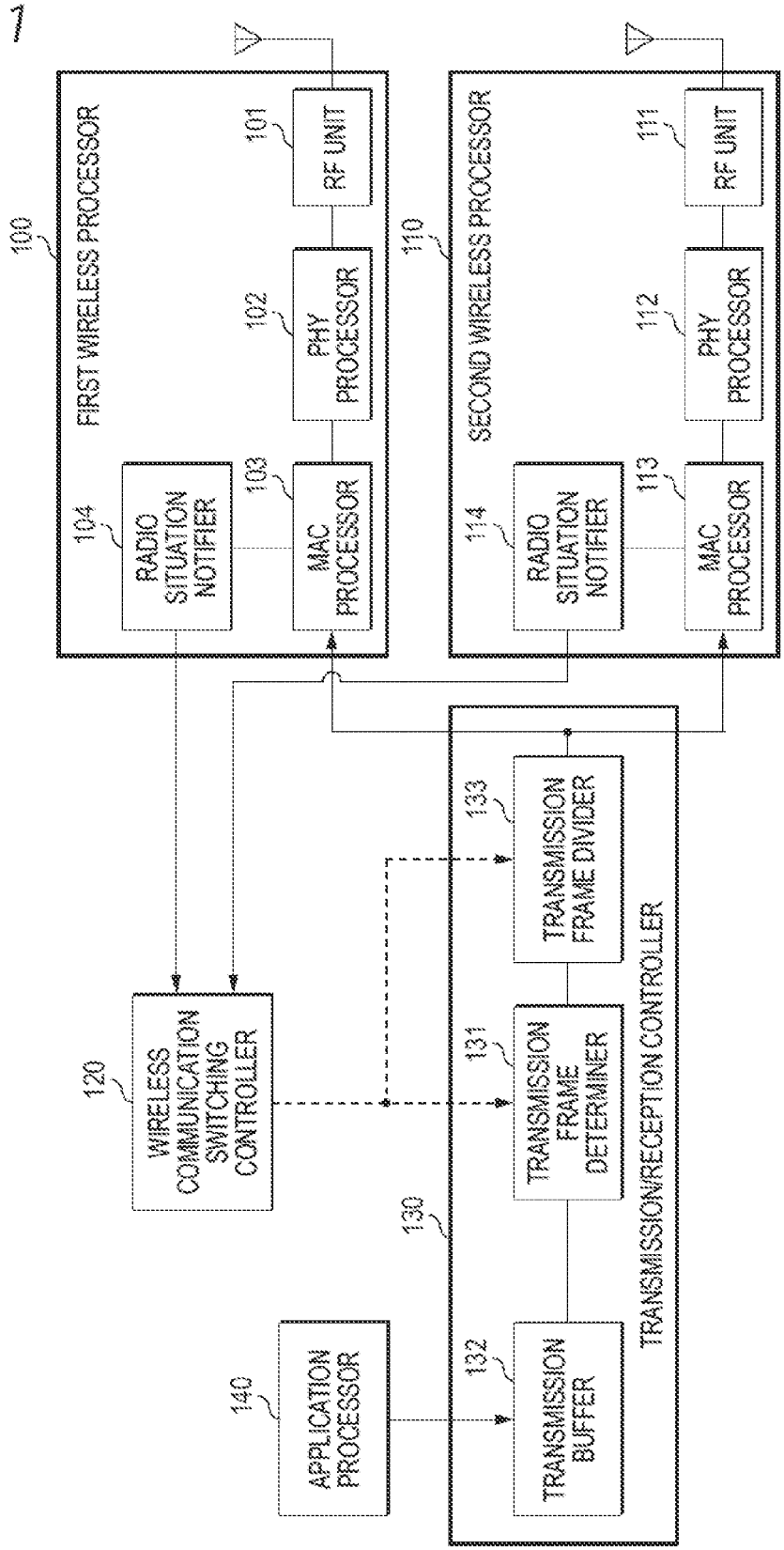
FIG. 1 is a block diagram showing the internal configuration of a wireless communication apparatus according to a first embodiment of the present disclosure.

FIG. 1 is a block diagram showing the internal configuration of a wireless communication apparatus according to a first embodiment of the disclosure. In FIG. 1, the internal configurations of the first wireless processor 100 and the second wireless processor 110 are the same as in the conventional wireless communication apparatus shown in FIG. 8 and hence constituent elements having the same ones in the conventional wireless communication apparatus are given the same reference symbols as the latter.

As shown in FIG. 1, the wireless communication apparatus according to the first embodiment includes an application processor 140, a first wireless processor 100, a second wireless processor 110, a wireless communication switching controller 120, and a transmission/reception controller 130. A wireless communication scheme (hereinafter referred to as a "first wireless communication scheme") employed by the first wireless processor 100 and a wireless communication scheme (hereinafter referred to as a "second wireless communication scheme") employed by the second wireless processor 200 are different from each other. The individual constituent elements of the wireless communication apparatus according to the first embodiment will be described below.

The application processor 140 performs processing in the seventh layer (application layer) to the third layer (network layer) of the OSI reference model. When the wireless communication apparatus performs a data communication, the application processor 140 generates transmission frames according to an MTU (maximum transmitter) size that is calculated on the basis of a larger one of a transmission SDU (service data unit) size prescribed by the first wireless communication scheme and a transmission SDU size prescribed by the second wireless communication scheme, and supplies them to the transmission/reception controller 130.

The first wireless processor 100 performs processing in the second layer (data link layer) and the first layer (physical layer) of the OSI reference model according to the first wireless communication scheme. Likewise, the second wireless processor 110 performs processing in the second layer (data link layer) and the first layer (physical layer) of the OSI reference model according to the second wireless communication scheme. As shown in FIG. 1, the first wireless processor 100 has a MAC (media access control) processor 103, a PHY (physical layer) processor 102, an RF (radio frequency) unit 101, and a radio situation notifier 104. Likewise, the second wireless processor 110 has an RF unit 111, a PHY processor 112, a MAC processor 113, and a wireless communication situation notifier 114.

The individual constituent elements of the first wireless processor 100 will be described below.

The MAC processor 103 performs MAC transmission processing (e.g., attachment of sequence numbers and encryption processing) that is prescribed by the first wireless communication scheme on transmission MSDUs (MAC service data units) received from the transmission/reception controller 130, and outputs transmission PSDUs (PHY service data units) to the PHY processor 102. The MAC processor 103 also performs MAC reception processing (e.g., discard of duplicate sequence numbers and decryption processing) that is prescribed by the first wireless communication scheme, and outputs reception MSDUs to the transmission/reception controller 130.

The PHY processor 102 performs PHY transmission processing (e.g., coding processing and modulation processing) that is prescribed by the first wireless communication scheme, and outputs transmission frames to the RF unit 101. Furthermore, the PHY processor 102 performs PHY reception processing (e.g., demodulation processing and decoding processing) that is prescribed by the first wireless communication scheme, and outputs reception PSDUs to the MAC processor 103.

The RF unit 101 transmits transmission frames in a prescribed radio frequency band. Furthermore, the RF unit 101 supplies, to the PHY processor 102, reception frames received in the prescribed radio frequency band. The radio situation notifier 104 measures a radio wave situation including a reception power value, a reception error rate, the number of times of retransmissions, or the like, and supplies a radio situation notification signal to the wireless communication switching controller 120.

The individual constituent elements of the second wireless processor 110 operate in the same manners as the corresponding ones of the first wireless processor 100.

The wireless communication switching controller 120 determines whether the wireless communication apparatus should perform a communication according to the first wireless communication scheme or the second wireless communication scheme on the basis of respective radio situation notification signals supplied from the first wireless processor 100 and the second wireless processor 110. The wireless communication switching controller 120 instructs the transmission/reception controller 130 to perform a communication according to the determined wireless communication scheme.

The transmission/reception controller 130 performs processing in the fourth layer (transport layer) and the third layer (network layer) of the OSI reference model. As shown in FIG. 1, the transmission/reception controller 130 has a transmission buffer 132, a transmission frame determiner 131, and a transmission frame divider 133. The individual constituent elements of the transmission/reception controller 130 will be described below.

The transmission buffer 132 temporarily stores transmission frames that are input from application processor 140. The transmission frame determiner 131 determines which of the transmission frames stored in the transmission buffer 132 should be transmitted first on the basis of a retransmission state and information indicating a wireless communication scheme specified by the wireless communication switching controller 120, and outputs transmission frames that are read from the transmission buffer 132.

If the size of a transmission frame that has been read from the transmission buffer 132 by the transmission frame determiner 131 is larger than the maximum SDU size of the wireless communication scheme specified by the wireless communication switching controller 120, the transmission frame divider 133 divides the transmission frame into plural divided transmission frames and outputs the latter. The transmission frame divider 133 divides the transmission frame into divided transmission frames whose sizes are smaller than or equal to the maximum SDU size of the wireless communication scheme specified by the wireless communication switching controller 120.

The transmission frame that has been read from the transmission buffer 132 by the transmission frame determiner 131 or the divided transmission frames generated by the transmission frame divider 133 are supplied to the wireless processor that employs the wireless communication scheme specified by the wireless communication switching controller 120.

Figure 2:
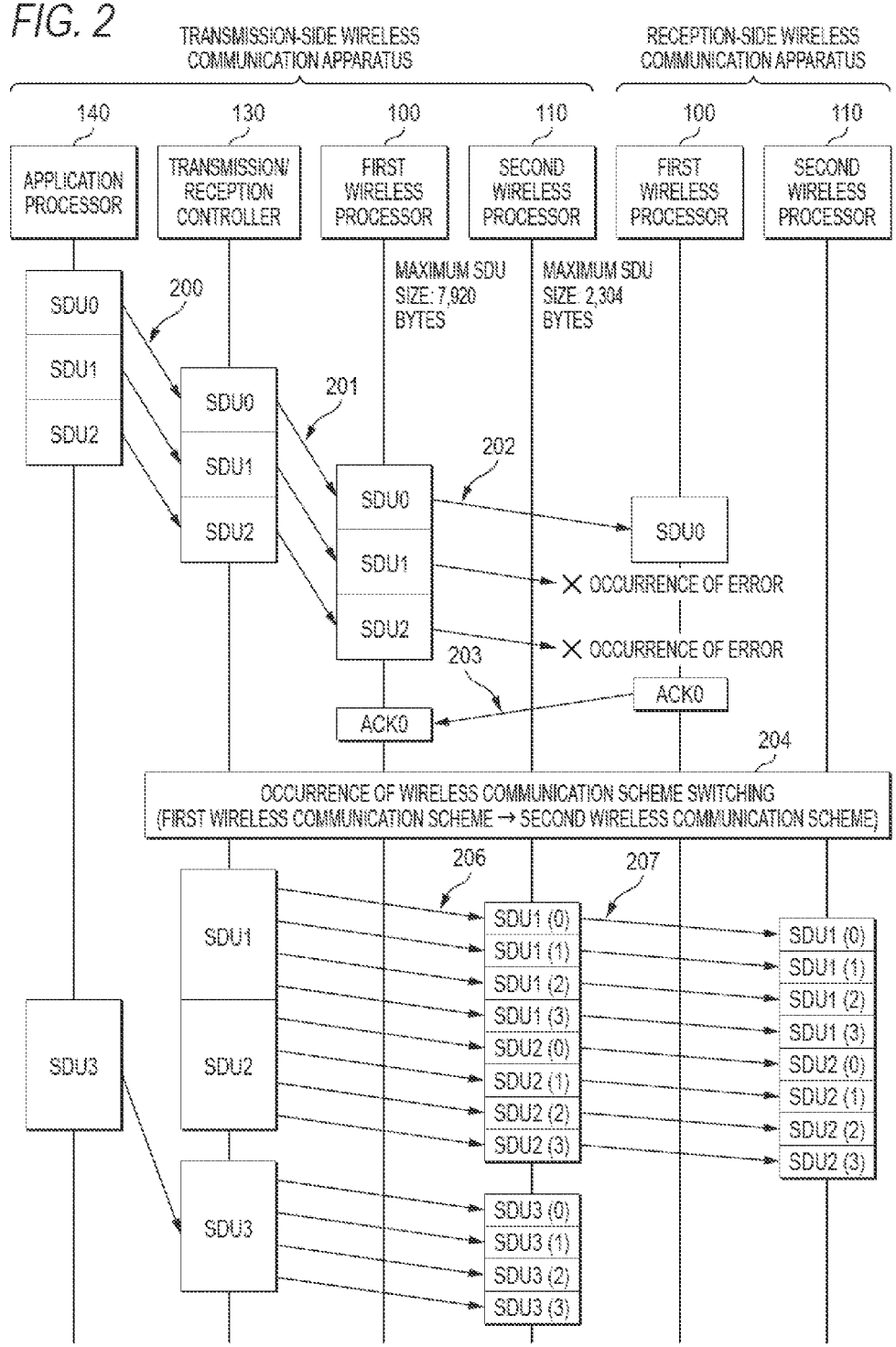
FIG. 2 is a timing chart showing how the wireless communication apparatus according to the first embodiment of the disclosure operates when the wireless communication scheme is switched.

FIG. 2 is a timing chart showing how the wireless communication apparatus according to the first embodiment of the disclosure operates when the wireless communication scheme is switched. In the example of FIG. 2, the maximum SDU size of the first wireless communication scheme is larger than that of the second wireless communication scheme and switching occurs from the first wireless communication scheme to the second wireless communication scheme. For example, the first wireless communication scheme is a WLAN scheme (WiGig (registered trademark)) that uses a millimeter wave band (e.g., 60 GHz frequency band) and the second wireless communication scheme is a WLAN scheme (e.g., Wi-Fi (registered trademark)) that uses a microwave band (e.g., 2.4 GHz frequency band). The maximum SDU sizes of WiGig and Wi-Fi are 7,920 bytes and 2,304 bytes, respectively.

In the example of FIG. 2, three transmission frames SDU0, SDU1, and SDU2 (generated in this order) of 7,920 bytes generated by the application processor 140 are transferred to the transmission/reception controller 130 from the application processor 140 by transmission frame transfers 200 and stored in the transmission buffer 132 of the transmission/reception controller 130. In transmission frame transfers 201 from the transmission/reception controller 130 to the first wireless processor 100, the transmission frames SDU0, SDU1, and SDU2 stored in the transmission buffer 132 are transferred in this order to the MAC processor 103 of the first wireless processor 100. Subsequently, data transmissions 202 are performed according to the first wireless communication scheme which is employed by the first wireless processor 100. In the data transmissions 202, the transmission frames SDU0, SDU1, and SDU2 which have been transferred to the MAC processor 103 by the transmission frame transfers 201 are sent out in this order from the first wireless processor 100 to a radio propagation path.

A transmission frame that has been sent out to the radio propagation path may not reach the reception-side wireless communication apparatus depending on the radio environment due to occurrence of an error on the radio propagation path. In the example of FIG. 2, the transmission frames SDU1 and SDU2 do not reach the reception-side wireless communication apparatus due to errors occurring on the radio propagation path. In this case, in an ACK data reception 23 of the wireless communication scheme employed by the first wireless processor 100, only a delivery acknowledgment frame ACK0 for the transmission frame SDU0 which has reached the reception-side wireless communication apparatus is received. The transmission frames SDU1 and SDU2 remain in the transmission buffer 132.

If wireless communication scheme switching 204 occurs in this state in the transmission-side wireless communication apparatus, switching is made from the first wireless communication scheme to the second wireless communication scheme. At this time, in the transmission-side wireless communication apparatus, the wireless communication switching controller 120 instructs the transmission/reception controller 130 to start a communication according to the second wireless communication scheme. After the switching to the second wireless communication scheme, to retransmit, according to the second wireless communication scheme, the transmission frames SDU1 and SDU2 for which no delivery acknowledgments have been received, in the transmission/reception controller 130 the transmission frame determiner 131 reads the transmission frames SDU1 and SDU2 from the transmission buffer 132. Subsequently, the transmission frame divider 133 divides the transmission frame SDU1 into four divided transmission frames SDU1(0) to SDU1(3) and divides the transmission frame SDU2 into four divided transmission frames SDU2(0) to SDU2(3).

In transmission frame transfers 206 from the transmission/reception controller 130 to the second wireless processor 110, the divided transmission frames SDU1(0)-SDU1(3) and SDU2(0)-SDU2(3) are transferred in this order to the MAC processor 113 of the second wireless processor 110. Subsequently, data transmissions 207 are performed according to the second wireless communication scheme which is employed by the second wireless processor 110. In the data transmissions 207, the divided transmission frames SDU1(0)-SDU1(3) and SDU2(0)-SDU2(3) which have been transferred to the MAC processor 113 by the transmission frame transfers 206 are sent out in this order from the second wireless processor 110 to a radio propagation path.

Figure 3:
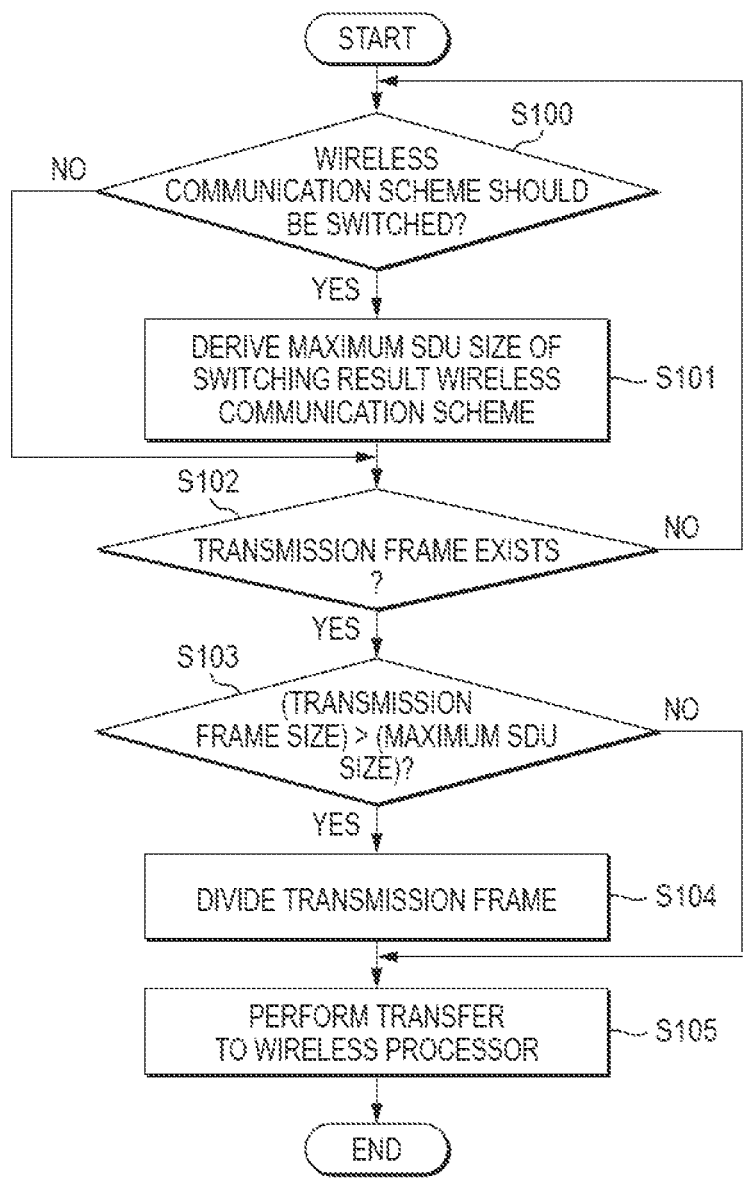
FIG. 3 is a flowchart showing how the wireless communication apparatus according to the first embodiment of the disclosure performs a data transmission.

FIG. 3 is a flowchart showing how the wireless communication apparatus according to the first embodiment of the disclosure performs a data transmission. As shown in FIG. 3, the wireless communication switching controller 120 judges whether the wireless communication scheme should be switched (step S100). The process moves to step S101 if switching should be made. If not, the process moves to step S102. At step S101, the transmission/reception controller 130 derives a maximum SDU size that is prescribed by a switching result wireless communication scheme. At step S102, the transmission frame determiner 131 of the transmission/reception controller 130 checks whether a transmission frame(s) is stored in the transmission buffer 132. The process moves to step S103 if a transmission frame(s) is stored. If not, the process returns to step S100.

At step S103, the transmission frame divider 133 of the transmission/reception controller 130 judges whether or not the size of the frame exceeds the maximum SDU size derived at step S101. The process moves to step S104 if the size of the frame exceeds the maximum SDU size. If not, the process returns to step S105. At step S104, the transmission frame divider 133 divides the transmission frame into plural divided transmission frames. At step S105, the transmission/reception controller 130 transfers, to the wireless processor, the transmission frame whose size is smaller than or equal to the maximum SDU size or the divided transmission frames generated at step S104.

As described above, according to this embodiment, when switching has been made between wireless communication schemes of different maximum SDU sizes, even if the size of a transmission frame remaining in the transmission buffer 132 is larger than the maximum SDU size of a switching result wireless communication scheme, the transmission frame can be transmitted after being divided instead of being discarded. Therefore, even if a radio propagation path error occurs at the time of a handover of wireless communication scheme switching, the data that suffered the error is retransmitted according to the switching result wireless communication scheme. As a result, data loss is suppressed and a high-quality communication is enabled.

The application processor 140 generates transmission frames according to an MTU size that is calculated on the basis of a larger one of the transmission SDU size prescribed of the first wireless communication scheme and the transmission SDU size of the second wireless communication scheme. As a result, a maximum throughput is expected when each wireless communication scheme is used.

In this embodiment, the transmission frame divider 133 may divide a transmission frame by a standard method such as IP fragmentation processing which is performed in the IP Internet protocol) layer.

Embodiment 2

Figure 4:
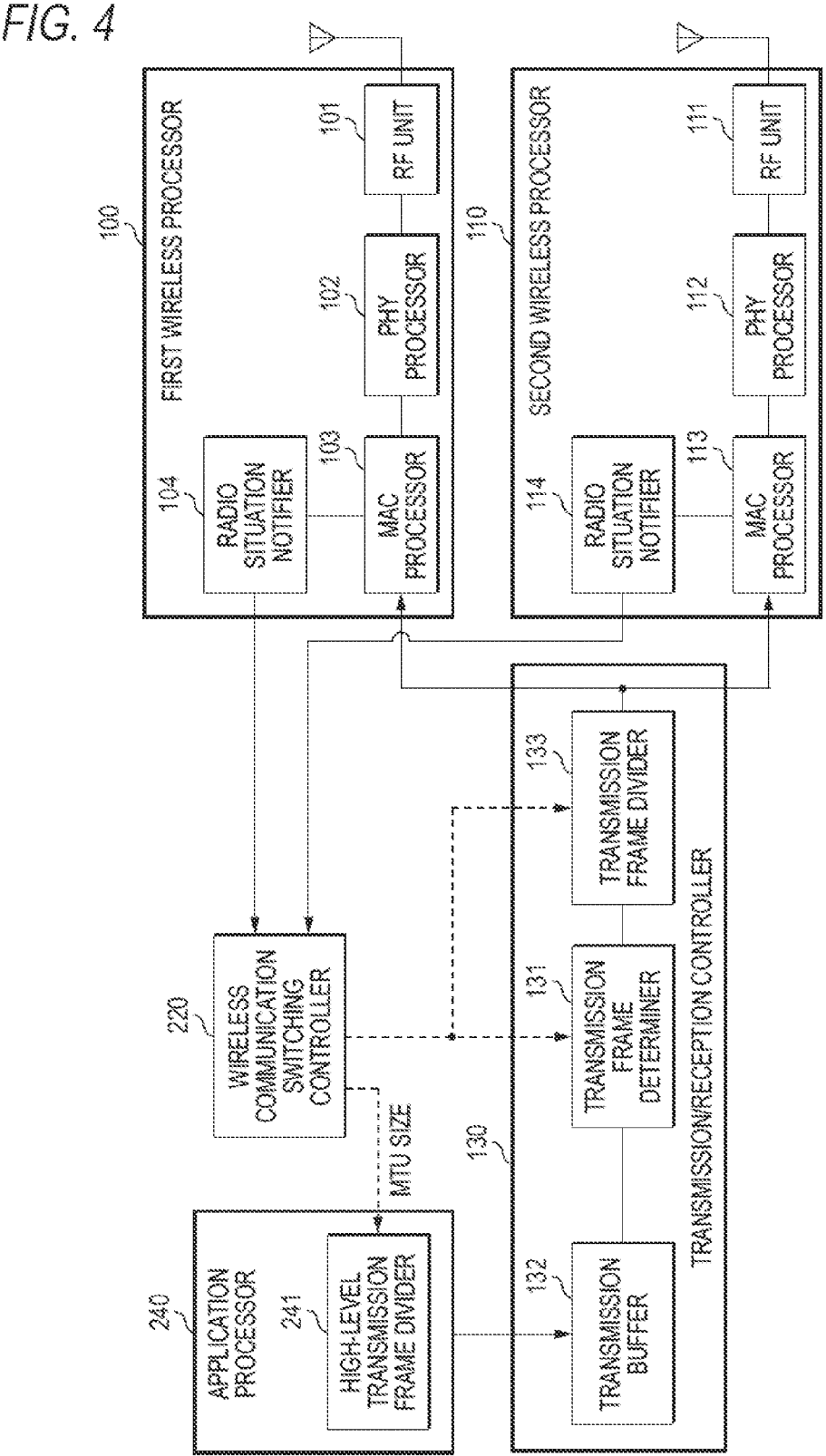
FIG. 4 is a block diagram showing the internal configuration of a wireless communication apparatus according to a second embodiment of the disclosure.

FIG. 4 is a block diagram showing the internal configuration of a wireless communication apparatus according to a second embodiment of the disclosure. The wireless communication apparatus according to the second embodiment is different from that according to the first embodiment in an application processor 240 and a wireless communication switching controller 220. In FIG. 4, constituent elements having the same ones in FIG. 1 are given the same reference symbols as the latter. In this embodiment, descriptions for items having the same or equivalent ones in the first embodiment will be simplified or omitted.

Like the wireless communication switching controller 120 used in the first embodiment, the wireless communication switching controller 220 used in the second embodiment determines whether the wireless communication apparatus should perform a communication according to the first wireless communication scheme or the second wireless communication scheme on the basis of respective radio situation notification signals supplied from the first wireless processor 100 and the second wireless processor 110. The wireless communication switching controller 220 calculates an MTU (maximum transmitter) size corresponding to the transmission SDU size of the determined wireless communication scheme. The wireless communication switching controller 220 instructs the transmission/reception controller 130 to perform a communication according to the determined wireless communication scheme. Furthermore, the wireless communication switching controller 220 informs the application processor 240 of the calculated MTU size.

Like the application processor 140 used in the first embodiment, the application processor 240 used in the second embodiment generates transmission frames according to an MTU size that is calculated on the basis of a larger one of a transmission SDU size of the first wireless communication scheme and a transmission SDU size of the second wireless communication scheme. The application processor 240 has a higher-level transmission frame divider 241 which performs transmission frame division processing such as IP fragmentation processing or TCP segmentation processing. The higher-level transmission frame divider 241 performs processing of dividing a transmission frame generated by the application processor 240 if its size is larger than an MTU size communicated from the wireless communication switching controller 220. The higher-level transmission frame divider 241 divides the transmission frame into divided transmission frames whose sizes are smaller than or equal to the MTU size. The dividing method of the higher-level transmission frame divider 241 is equivalent to that of the transmission frame divider 133 of the transmission/reception controller 130. The transmission frame generated by the application processor 240 or the divided transmission frames generated by the higher-level transmission frame divider 241 are supplied to the transmission/reception controller 130.

Figure 5:
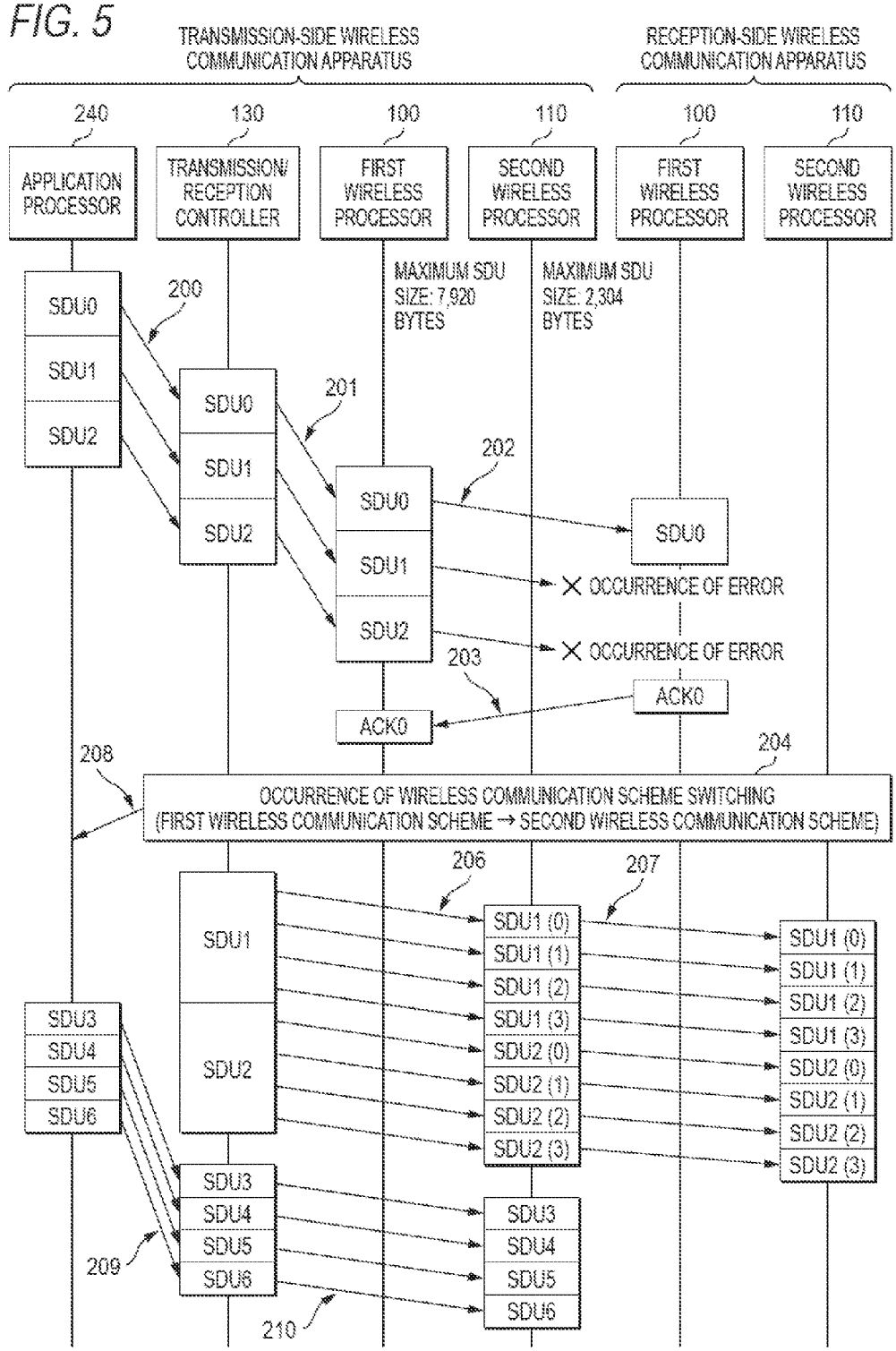
FIG. 5 is a timing chart showing how the wireless communication apparatus according to the second embodiment of the disclosure operates when the wireless communication scheme is switched.

FIG. 5 is a timing chart showing how the wireless communication apparatus according to the second embodiment of the disclosure operates when the wireless communication scheme is switched. In the timing chart of FIG. 5, constituent elements and pieces of processing having the same ones in the timing chart of FIG. 2 are given the same symbols as the latter. And descriptions for them will be simplified or omitted. In the example of FIG. 5, as in the example of FIG. 2 (first embodiment), the maximum SDU size of the first wireless communication scheme is larger than that of the second wireless communication scheme and switching occurs from the first wireless communication scheme to the second wireless communication scheme. For example, the first wireless communication scheme is a WLAN scheme (WiGig (registered trademark)) that uses a millimeter wave band (e.g., 60 GHz frequency band) and the second wireless communication scheme is a WLAN scheme (e.g., Wi-Fi (registered trademark)) that uses a microwave band (e.g., 2.4 GHz frequency band). The maximum SDU sizes of WiGig and Wi-Fi are 7,920 bytes and 2,304 bytes, respectively.

In the example of FIG. 5, when wireless communication scheme switching 204 occurs in the transmission-side wireless communication apparatus, switching is made from first wireless communication scheme to the second wireless communication scheme. At this time, in the transmission-side wireless communication apparatus, the wireless communication switching controller 220 communicates, to the application processor 240, a notice 208 indicating an MTU size corresponding to the transmission SDU size of the second wireless communication scheme. In response to the notice 208, the higher-level transmission frame divider 241 of the application processor 240 starts processing of dividing transmission frames that follow a transmission frame SDU2.

In divided transmission data transfers 209 from the application processor 240 to the transmission/reception controller 130, divided transmission frames SDU3, SDU4, SDU5, and SDU6 are stored in the transmission buffer 132 of the transmission/reception controller 130. In divided transmission frame transfers 210 from the transmission/reception controller 130 to the second wireless processor 110, the transmission frames SDU3, SDU4, SDU5, and SDU6 stored in the transmission buffer 132 are transferred in this order to the MAC processor 113 of the second wireless processor 110. Subsequently, data transmissions are performed according to the second wireless communication scheme which is employed by the second wireless processor 110.

Figure 6:
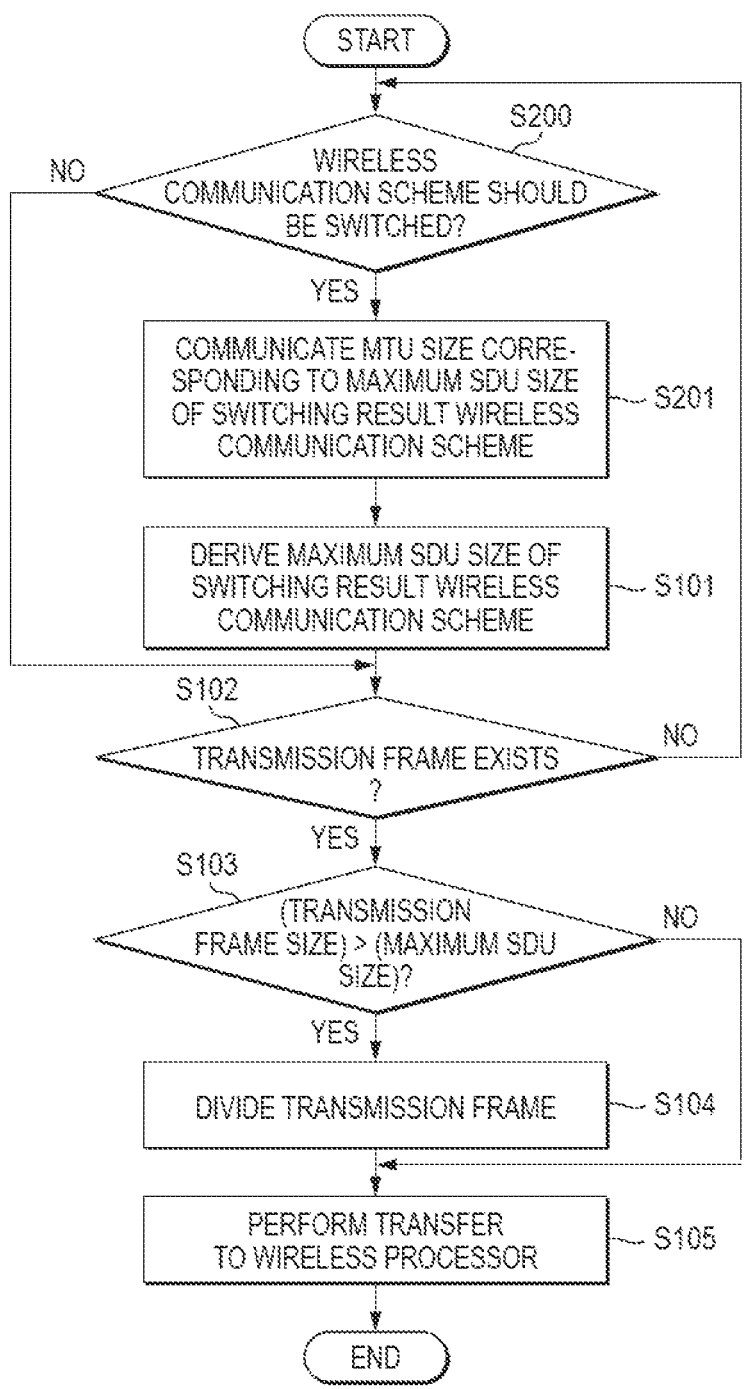
FIG. 6 is a flowchart showing how the wireless communication apparatus according to the second embodiment of the disclosure performs a data transmission.

FIG. 6 is a flowchart showing how the wireless communication apparatus according to the second embodiment of the disclosure performs a data transmission. In the flowchart of FIG. 6, steps having the same ones in the flowchart of FIG. 3 are given the same symbols as the latter. And descriptions for them will be simplified or omitted.

As shown in FIG. 6, the wireless communication switching controller 220 judges whether the wireless communication scheme should be switched (step S200). The process moves to step S201 if switching should be made. If not, the process moves to step S102. At step S201, the wireless communication switching controller 220 informs the application processor 240 of an MTU size corresponding to a maximum SDU size that is prescribed by a switching result wireless communication scheme. After this notification is made, the process moves to step S101. The step S101 and the following steps are the same as in the process of the first embodiment shown in FIG. 3.

As described above, according to this embodiment, when switching has been made between wireless communication schemes of different maximum SDU sizes, even if the size of a transmission frame remaining in the transmission buffer 132 is larger than the maximum SDU size of a switching result wireless communication scheme, the transmission frame can be transmitted after being divided instead of being discarded. Furthermore, each of transmission frames that are stored in the transmission buffer 132 after wireless communication scheme switching is divided by the higher-level transmission frame divider 241 of the application processor 240 into divided transmission frames whose sizes are within the maximum SDU size of a switching result wireless communication scheme. Therefore, it is no longer necessary for the transmission frame divider 133 of the transmission/reception controller 130 to divide these transmission frames. As a result, the processing amount relating to the division by the transmission/reception controller 130 can be reduced, which allows it to be implemented as an inexpensive CPU or hardware.

The above-described wireless communication switching controller 220 may judge whether to inform the application processor 240 of an MTU size on the basis of a wireless communication state that occurs after wireless communication scheme switching. For example, a wireless communication state is judged on the basis of such a condition as a reception power value, a reception error rate, or the number of times of retransmissions that is indicated by a radio situation notification signal received from the first wireless processor 100 or the second wireless processor 110. If a wireless communication state after wireless communication scheme switching is bad, that is, if the reception power value is smaller than a threshold value or the reception error rate or the number of times of retransmissions is higher or larger than or equal to a threshold value, it is highly probable that a radio propagation path error will occur frequently or switching to the original or another wireless communication scheme occurs soon. Therefore, in making this judgment, the wireless communication switching controller 220 judges that it should not inform the application processor 240 of an MTU size if a wireless communication state is bad. This makes it possible to reduce the number of events that the application processor 240 uselessly performs processing of switching the size of transmission frames.

Figure 7:
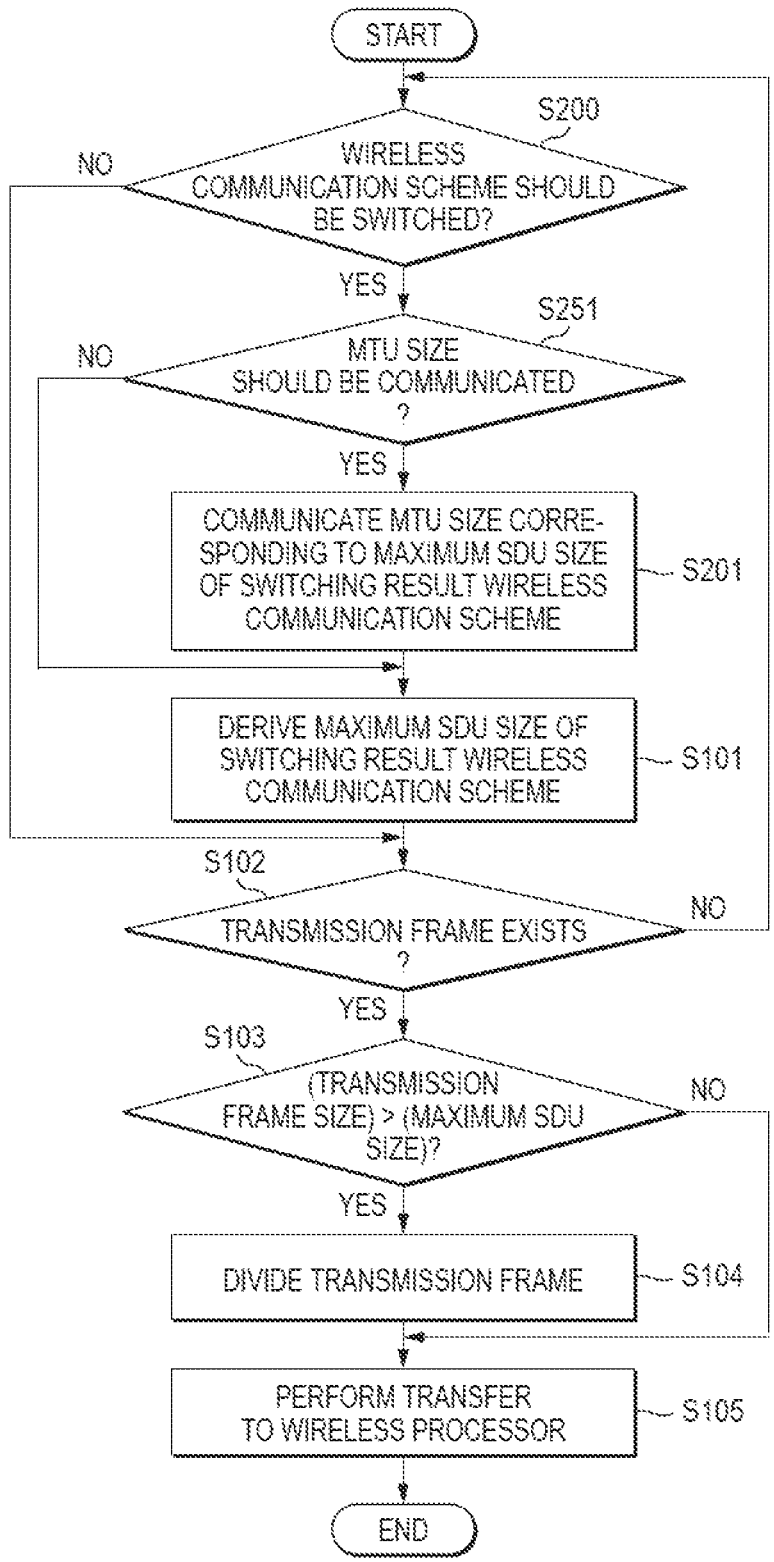
FIG. 7 is a flowchart showing how the wireless communication apparatus according to the second embodiment of the disclosure judges whether to communicate an MTU size in performing a data transmission.

FIG. 7 is a flowchart showing how the wireless communication apparatus according to the second embodiment of the disclosure judges whether to communicate an MTU size in performing a data transmission. In the flowchart of FIG. 7, steps having the same ones in the flowchart of FIG. 6 are given the same symbols as the latter. And descriptions for them will be simplified or omitted.

As shown in FIG. 7, the wireless communication switching controller 220 judges whether the wireless communication scheme should be switched (step S200). The process moves to step S251 if switching should be made. If not, the process moves to step S102. At step S251, the wireless communication switching controller 220 judges whether to inform the application processor 240 of an MTU size on the basis of a wireless communication state that occurs after wireless communication scheme switching. The process moves to step S201 if the wireless communication switching controller 220 judges that an MTU size should be communicated. If not, the process moves to step S101.

Although the above embodiments are directed to the wireless communication apparatus which can switch between the first wireless communication scheme and the second wireless communication scheme, the number of wireless communication schemes between which switching can be made is not limited to two and may be three or more.

Although each of the above embodiments is directed to an example case that the disclosure is implemented by hardware, the disclosure can also be implemented by software in coordination with hardware.

Each of the functional blocks used in the description of each of the embodiments is typically implemented as an LSI which is an integrated circuit. The functional blocks may be implemented in one-chip form individually or all or part of them may be implemented as one chip. Although the term "LSI" is used here, other terms "IC," "system LSI," "super LSI," and "ultra LSI" may also be used depending on the integration density.

The manner of circuit integration is not limited to formation of an LSI and may be formation of a dedicated circuit or use of a general-purpose processor. An FPGA (field programmable gate array) which can be programmed after implementation as an LSI or a reconfigurable processor in which connections between and settings of circuit cells provided inside an LSI can be reconfigured may also be used.

Further, if an integrated circuit technology to replace the LSI formation technology appears as a result of advancement of the semiconductor technologies or birth of another, spin-off technology, naturally the integration of the functional blocks may be attained using such a technology. One possibility is use of a biotechnology.

Although the invention has been described in detail by referring to the particular embodiments, it is apparent to those skilled in the art that various changes and modifications are possible without departing from the spirit and scope of the invention.

The present application is based on Japanese Patent Application No. 2013-049366 filed on Mar. 12, 2013, the disclosure of which is incorporated herein by reference.

INDUSTRIAL APPLICABILITY

The wireless communication apparatus according to the disclosure can be applied to transmitters etc. which realize a high-quality communication by suppressing data loss even at the time of switching between wireless communication schemes that are different from each other in maximum transmission SDU size.

DESCRIPTION OF SYMBOLS

100: First wireless processor
101, 111: RF unit
102, 112: PHY processor
103, 113: MAC processor
104, 114: Radio situation notifier
110: Second wireless processor
120, 220: Wireless communication switching controller
130: Transmission/reception controller
131: Transmission frame determiner
132: Transmission buffer
133: Transmission frame divider
140, 240: Application processor
241: Higher-level transmission frame divider

The invention claimed is:

1. A wireless communication apparatus which performs a data transmission and reception while switching between plural wireless communication schemes that are different from each other in maximum transmission frame size, the wireless communication apparatus comprising:
    a scheme selector that selects one of the plural wireless communication schemes;
    a transmission frame generator that generates a transmission frame;
    a transmission frame divider that divides the transmission frame generated by the transmission frame generator if a size of the transmission frame is larger than a maximum transmission frame size of the wireless communication scheme selected by the scheme selector; and
    a wireless transmitter that transmits, according to the wireless communication scheme selected by the scheme selector, the transmission frame generated by the transmission frame generator or divided transmission frames generated by the transmission frame divider by dividing the transmission frame,
    wherein the transmission frame divider divides the transmission frame into the divided transmission frames each having a size that is smaller than or equal to the maximum transmission frame size of the wireless communication scheme selected by the scheme selector.

2. The wireless communication apparatus according to claim 1, wherein the transmission frame generator generates a transmission frame that conforms to a largest one of the maximum transmission frame sizes of the plural wireless communication schemes.

3. The wireless communication apparatus according to claim 1, wherein the scheme selector informs the transmission frame generator of a maximum transmission size corresponding to the maximum transmission frame size of the selected wireless communication scheme;
    wherein the transmission frame generator comprises a higher-level transmission frame divider that divides the generated transmission frame if the size of the generated transmission frame is larger than the maximum transmission size communicated from the scheme selector; and
    wherein the higher-level transmission frame divider divides the transmission frame into divided transmission frames each having a size that is smaller than or equal to the maximum transmission size communicated from the scheme selector.

4. The wireless communication apparatus according to claim 3, wherein the higher-level transmission frame divider employs a dividing method that is equivalent to a dividing method employed by the transmission frame divider.

5. The wireless communication apparatus according to claim 3, wherein the scheme selector informs the transmission frame generator of the maximum transmission size corresponding to the maximum transmission frame size of the selected wireless communication scheme if a wireless communication state that occurs after switching to the selected wireless communication scheme satisfies a prescribed condition.

6. A transmission frame control method of a wireless communication apparatus which performs a data transmission and reception while switching between plural wireless communication schemes that are different from each other in maximum transmission frame size, the transmission frame control method comprising:
    a scheme selection step of selecting one of the plural wireless communication schemes;
    a transmission frame generating step of generating a transmission frame;
    a transmission frame dividing step of dividing the transmission frame generated by the transmission frame generating step if a size of the transmission frame is larger than a maximum transmission frame size of the wireless communication scheme selected by the scheme selection step; and
    a wireless transmission step of transmitting, according to the wireless communication scheme selected by the scheme selection step, the transmission frame generated by the transmission frame generating step or divided transmission frames generated by the transmission frame dividing step by dividing the transmission frame,
    wherein in the transmission frame dividing step, the transmission frame is divided into the divided transmission frames each having a size that is smaller than or equal to the maximum transmission frame size of the wireless communication scheme selected by the scheme selection step.

* * * * *